United States Patent
Vander Kamp et al.

(10) Patent No.: US 11,048,626 B1
(45) Date of Patent: Jun. 29, 2021

(54) TECHNOLOGY TO ENSURE SUFFICIENT MEMORY TYPE RANGE REGISTERS TO FULLY CACHE COMPLEX MEMORY CONFIGURATIONS

(71) Applicant: Intel Corporation, Santa Clara, CA (US)

(72) Inventors: Kerry Vander Kamp, Hillsboro, OR (US); Jason Voelz, Lexington, SC (US); James Goffena, Columbia, SC (US); Robert Branch, Portland, OR (US); Mahesh Natu, Folsom, CA (US); Anand Enamandram, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/797,796

(22) Filed: Feb. 21, 2020

(51) Int. Cl.
G06F 12/02 (2006.01)
G06F 12/0802 (2016.01)
G06F 9/50 (2006.01)
G06F 12/14 (2006.01)

(52) U.S. Cl.
CPC ........ G06F 12/0292 (2013.01); G06F 9/5005 (2013.01); G06F 12/0802 (2013.01); G06F 12/1441 (2013.01)

(58) Field of Classification Search
CPC ............ G06F 12/0292; G06F 12/0802; G06F 12/1441; G06F 12/0246; G06F 3/061; G06F 9/5005
See application file for complete search history.

(56) References Cited

U.S. PATENT DOCUMENTS

| | | | | |
|---|---|---|---|---|
| 5,752,273 | A * | 5/1998 | Nemirovsky | G06F 9/30043 711/201 |
| 6,848,039 | B1 * | 1/2005 | Aaron | G06F 9/4411 711/118 |
| 9,838,197 | B2 * | 12/2017 | Li | H04L 7/033 |
| 10,839,878 | B1 * | 11/2020 | Porzio | G11C 8/00 |
| 2007/0038847 | A1 * | 2/2007 | Yeh | G06F 9/3824 712/225 |
| 2008/0307173 | A1 * | 12/2008 | Yeh | G06F 12/0607 711/157 |
| 2013/0081043 | A1 * | 3/2013 | Glew | G06F 9/3836 718/104 |

(Continued)

OTHER PUBLICATIONS

Intel, Write Combining Memory Implementation Guidlines, Nov. 1998 (Year: 1998).*

(Continued)

*Primary Examiner* — Khoa D Doan
(74) *Attorney, Agent, or Firm* — Jordan IP Law, LLC

(57) ABSTRACT

Systems, apparatuses and methods may provide for technology that detects a misalignment condition, wherein the misalignment condition includes a memory map being misaligned with a granularity of a register, automatically appends a protected range to the memory map, wherein the protected range eliminates the misalignment condition, and defines an operational characteristic of the memory map via the register. In one example, the protected range is a non-existent memory (NXM) range appended via a source address decoder (SAD) rule, the register is a memory type range register (MTRR), and the operational characteristic is a cache characteristic.

24 Claims, 7 Drawing Sheets

(56) References Cited

U.S. PATENT DOCUMENTS

2014/0143494 A1* 5/2014 Whalley ............ G06F 12/0862
 711/122

OTHER PUBLICATIONS

Intel Corporation, Intel 64 and IA-32 Architectures Software Developer's Manual, <intel.com/content/dam/www/public/us/en/documents/manuals/64-ia-32-architectures-software-developer-instruction-set-reference-manual-325383.pdf>, Oct. 2019, Combined vols. 1, 2A-2D, 3A-3D, and 4, 5038 pages.

Intel Corporation, Intel Xeon Processor 7500 Series, <C:/Users/TEST/Downloads/xeon-processor-7500-series-vol-2-datasheet.pdf>, Mar. 2010, vol. 2, 170 pages.

M. Hillenbrand, Physical Address Decoding in Intel Xeon v3/v4 CPUs: A Supplemental Datasheet, <os.itec.kit.edu/downloads/publ_2017_hillenbrand_xeon_decoding.pdf>, Sep. 5, 2017, 21 pages, Karlsruhe Institute of Technology.

Wikipedia, "Memory Type Range Register", <en.wikipedia.org/wiki/Memory_type_range_register>, retrieved Feb. 3, 2020, 3 pages.

* cited by examiner

```
                                    40
MTRR Default Type: 0000000000000C00
Variable MTRR[00]: Base=0000000000000006 Mask=00003C0000000800
Variable MTRR[01]: Base=0000400000000006 Mask=00003F0000000800
Variable MTRR[02]: Base=0000500000000006 Mask=00003F8000000800
Variable MTRR[03]: Base=0000580000000006 Mask=00003FC000000800
Variable MTRR[04]: Base=00005C0000000006 Mask=00003FE000000800
Variable MTRR[05]: Base=00005E0000000006 Mask=00003FF000000800
Variable MTRR[06]: Base=00005E2000000006 Mask=00003FF8000000800
Variable MTRR[07]: Base=00005E2700000006 Mask=00003FFF00000800

WB:0000000000000000-000000000009FFFF
UC:00000000000A0000-00000000000FFFFF  ← Fixed MTRRs (legacy)
WB:0000000000100000-0000005E26FFFFFF
UC:0000005E27000000-0000003FFFFFFFFFFF
```

42

```
MTRR Default Type: 000000000000C00
Variable MTRR[00]: Base=000000000000006 Mask=00003800000800

WB:0000000000000000-000000000009FFFF
UC:00000000000A0000-00000000000FFFFF  ← Fixed MTRRs (legacy)
WB:0000000000100000-000007FFFFFFFFFF  ←Protected above 0x5E270000000
UC:0000080000000000-00003FFFFFFFFFFF
```

Begin

52 — Detect a misalignment condition, wherein the misalignment condition includes a memory map being misaligned with a granularity of a register 54 — Append a protected range to the memory map, wherein the protected range eliminates the misalignment condition 56 — Define an operational characteristic of the memory map via the register End

FIG. 5

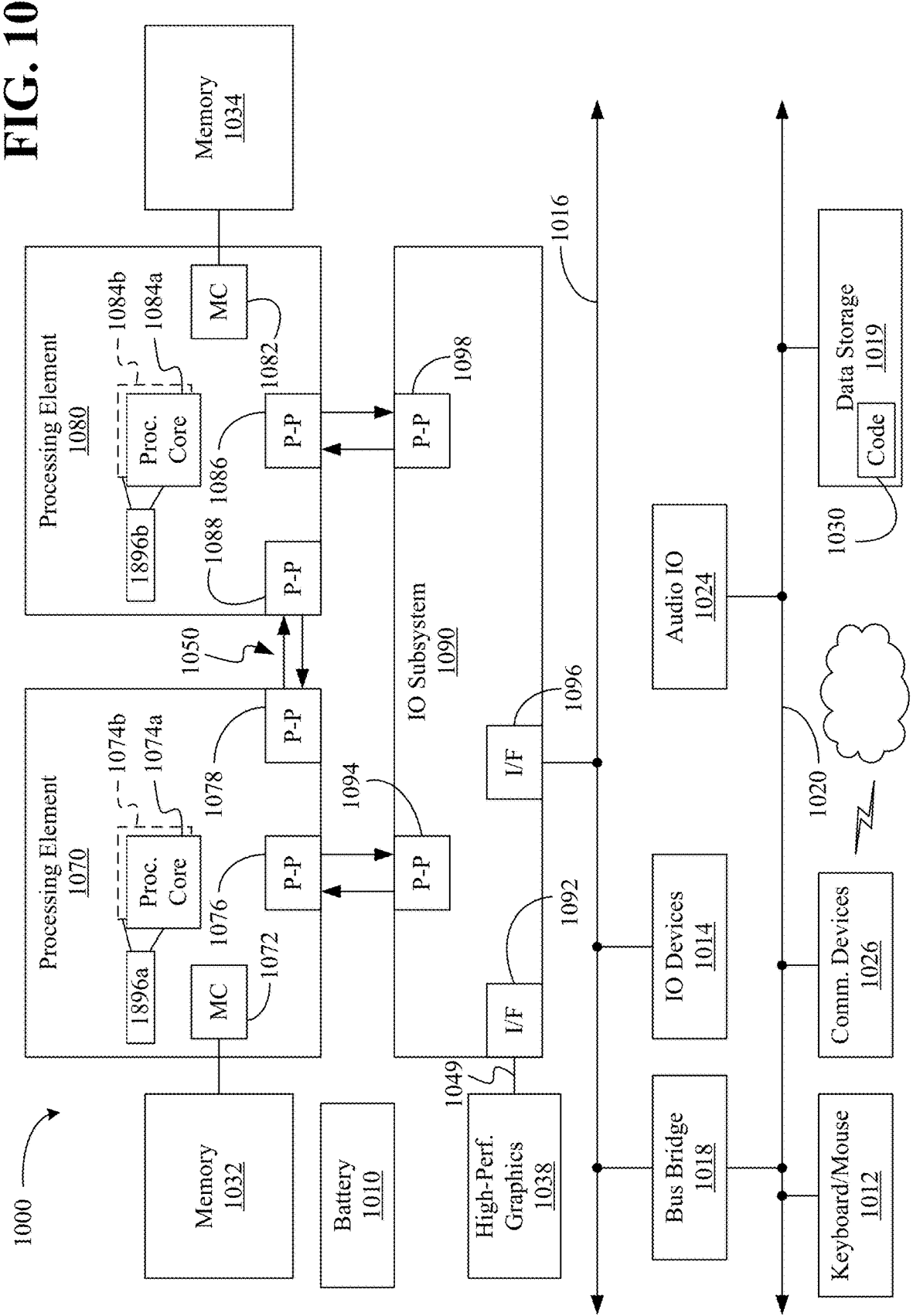

US 11,048,626 B1

TECHNOLOGY TO ENSURE SUFFICIENT MEMORY TYPE RANGE REGISTERS TO FULLY CACHE COMPLEX MEMORY CONFIGURATIONS

TECHNICAL FIELD

Embodiments generally relate to memory registers. More particularly, embodiments relate to technology to ensure sufficient memory type range registers (MTRRs) to fully cache complex memory configurations.

BACKGROUND

A boot sequence in a typical computing system may include the generation of a map (e.g., "memory map") between physical memory space and virtual memory space, followed by a cache initialization process. The cache initialization process may involve using MTRRs to control how address ranges in the memory map are cached (e.g., uncached, write-back cached, etc.). The number of MTRRs is generally fixed (e.g., ten register pairs), with each MTRR describing an address range that is sized at a power of two (e.g., $2^n$). Recently developed complex memory architectures may reserve a small percentage of available memory for internal use so that the remaining amount of available memory is not a power of two. In such a case, the memory map is "misaligned" with the MTRRs, which may in turn result in the use of a relatively high number of MTRRs to fully specify the cacheability of the memory architecture. Indeed, if the number of available MTRRs is exceeded, the boot sequence may halt due to a fatal error.

BRIEF DESCRIPTION OF THE DRAWINGS

The various advantages of the embodiments will become apparent to one skilled in the art by reading the following specification and appended claims, and by referencing the following drawings, in which:

FIG. 4 is an illustration of an example of a register coding configuration for an appended memory map according to an embodiment;

FIG. 5 is a flowchart of an example of a method of operating a performance-enhanced computing system according to an embodiment;

FIG. 10 is a block diagram of an example of a multi-processor based computing system according to an embodiment.

DESCRIPTION OF EMBODIMENTS

In a given processor (e.g., host processor, graphics processor), registers such as model specific registers (MSRs) may be used to set the operational characteristics of memory regions accessed by the processor. For example, a memory type range register (MTRR) is a relatively expensive MSR that is located in a processor core and specifies the cache characteristics of a memory range. Thus, an MTRR might specify that a certain memory range operates in a write-back (WB) mode so that when information associated with an address in the range is written to cache, the cache is marked "dirty" and the information is subsequently written to memory. Other possible cache modes include, for example, uncached (UC), write-through, write-protect, and so forth.

Figure 1:
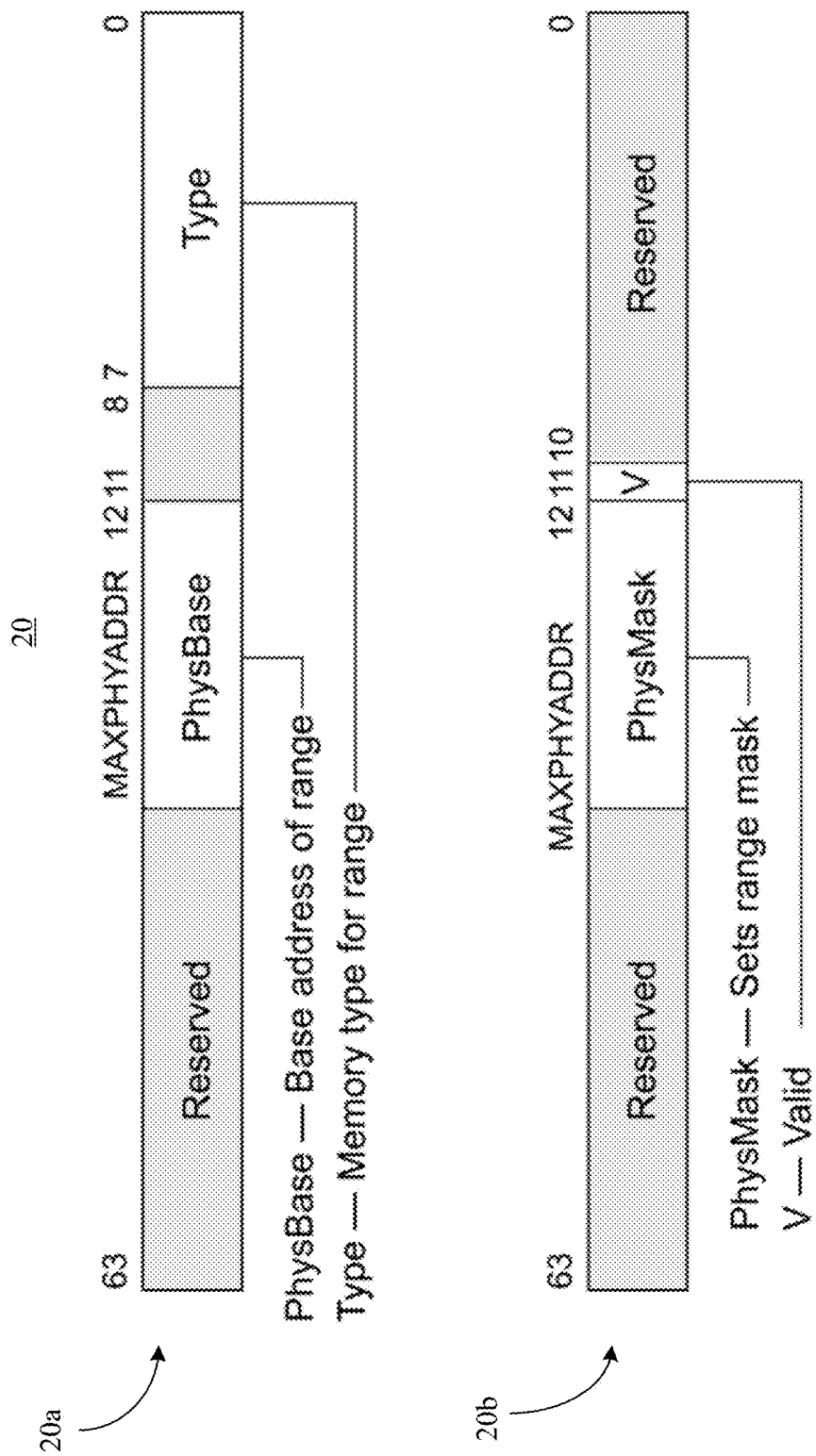
FIG. 1 is an illustration of an example of an MTRR set according to an embodiment.

Turning now to FIG. 1, a register set 20 (20a, 20b) is shown in which a base register 20a sets the base address of an address range ("PhysBase") and a mask register 20b sets a range mask ("PhysMask") for the base address. In an embodiment, the range mask is chosen so that when an AND operation is conducted between a target address in the address range of the base register 20a and the range mask of the mask register 20b, the result will return the same value as when the AND operation is conducted between the base address and the range mask. Thus, when such a condition occurs, the target address may be treated as specified in the base register 20a as the memory type for the range ("Type", e.g., write-back, uncached). In an embodiment, a given processor core contains a limited number (e.g., ten pairs) of the register set 20.

Of particular note is that the size of the address range defined by the illustrated register set 20 (e.g., the granularity) is a power of two. If the size of the memory range is not also a power of two (e.g., 1.75 GiB instead of 2 GiB), a misalignment condition may be present and several of the register sets 20 may be needed to specify the cache characteristics of the memory range. Indeed, such a case may be present in more complex memory architectures such as, for example, persistent memory modules (PMMs) and/or solid state drives (SSDs). In an embodiment, the misalignment condition is automatically detected and a protected range (e.g., a range that is inaccessible by the system) is automatically appended to the memory range to eliminate the misalignment condition. As will be discussed in greater detail, such an approach may reduce the number of registers needed to fully cache the memory configuration. Accordingly, performance may be enhanced in terms of fewer fatal errors and/or boot sequence faults. Performance may also be enhanced by mitigating loss of mapped memory (e.g., if a reduction of the amount of available memory would otherwise be conducted).

Figures 2, 3:
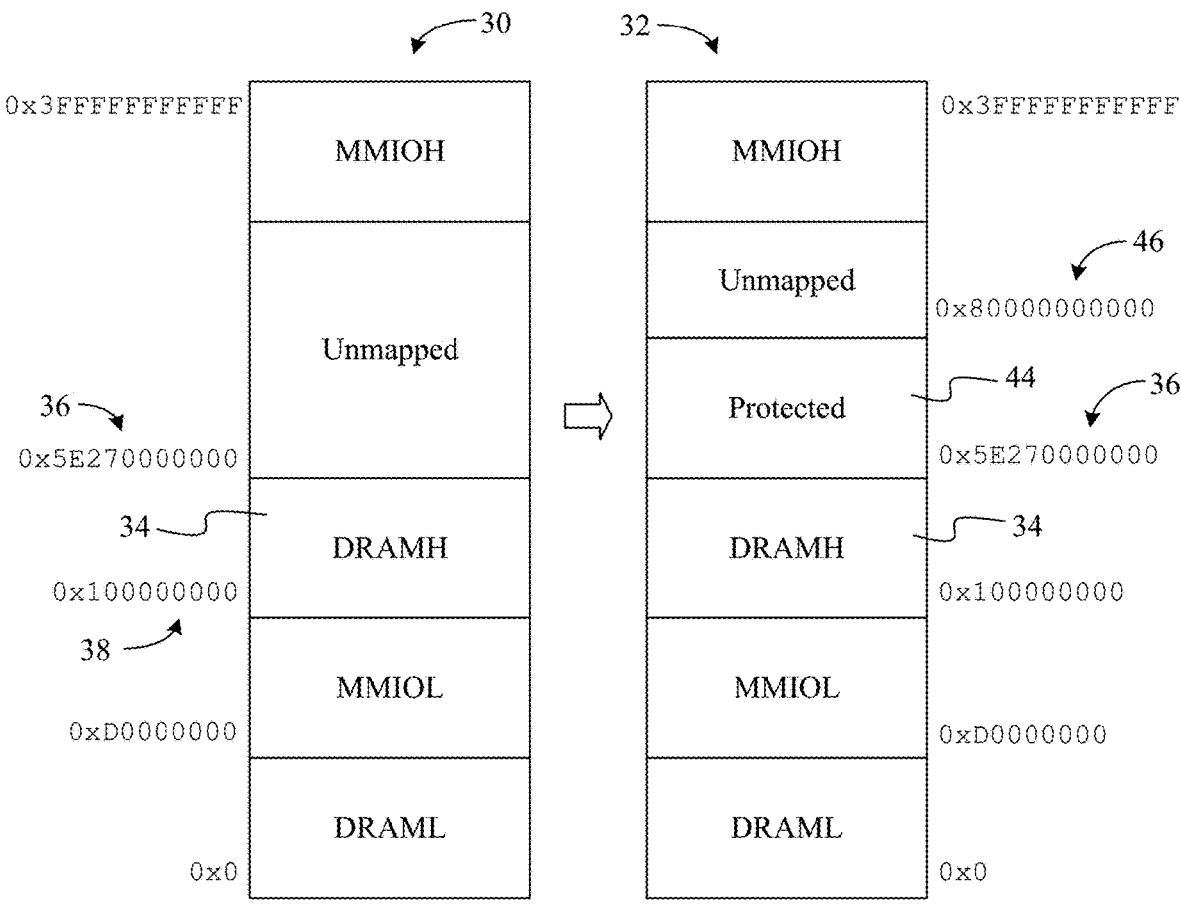
FIG. 2 is a comparative illustration of an example of a conventional memory map and an appended memory map according to an embodiment.
FIG. 3 is an illustration of an example of a register coding configuration for a conventional memory map.

FIG. 2 shows a conventional memory map 30 and an appended memory map 32. In the illustrated conventional example, an address range 34 (e.g., high dynamic random access memory/DRAMH) has an upper limit 36 (e.g., just below 0x5E270000000, or 0x5E26FFFFFFF) and a lower limit 38 (0x100000000). The physical address 0x5E270000000 includes nine address bits that are set to a value of one, resulting in a physical address that is not well aligned to a power of two. In the illustrated example, the upper limit 36 presents a misalignment condition because the upper limit 36 is not a power of two address.

With continuing reference to FIGS. 2-4, a conventional register coding configuration 40 calls for a total of eight variable MTRRs (MTRR[00]-MTRR[07]) to define the cache characteristics of the address range 34 and the regions above the address range 34 (e.g., "unmapped" and high memory mapped input output/MMIOH regions). This example shows BIOS (basic input/output system) setting MTRR default type=UC and then directly mapping WB regions using power of two math that specifies adjacent power of two size address ranges. These ranges together cover the entire range of DRAM from address zero to the top of high memory (DRAMH). As already noted, the MTRR base register specifies the starting address of the range and the mask specifies the limit of the range. Thus, the target address is within the range when address&mask=base&mask.

By contrast, a protected range 44 is appended to the memory map 32 to eliminate the misalignment condition. More particularly, the protected range 44 effectively moves the upper limit 36 of the address range 34 to a power of two address 46 (e.g., just below 0x80000000000, or 0x7FFFFFFFFFF). Accordingly, an enhanced register coding configuration 42 involves only a single MTRR (MTRR [00]) to define the cache characteristics of the address range 34. Although, the illustrated solution aligns to a power of two boundary and uses the least number of MTRRs, other solutions that do not align to a power of two address may also be used. For example, more than one MTRR pair may be used to enable mapping to a non-power of two address when there is not enough address space to align to a power of two address and/or summing power of two numbers does not result in a power of two value (e.g., 4 GB+4 GB+4 GB=12 GB, where 4 GB is power of two, but 12 GB is not). The illustrated memory map 32 therefore reduces the number of registers involved in fully caching the memory configuration and enhances performance at least in terms of fewer fatal errors, boot sequence faults and/or mapped memory losses.

FIG. 5 shows a method 50 of operating a performance-enhanced computing system. The method 50 may generally be implemented after the generation of a memory map (e.g., mapping physical memory space to virtual memory space) and during a cache initialization process in a computing system. More particularly, the method 50 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 50 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 52 provides for detecting a misalignment condition, wherein the misalignment condition includes a memory map being misaligned with a size of a register such as, for example, an MTRR. In an embodiment, block 52 includes automatically determining whether an upper limit of an address range in the memory map is at a power of two address (e.g., if the size of the register is also a power of two). Such a determination might be made by reading and/or querying the memory map from boot memory (e.g., Unified Extensible Firmware Interface/UEFI memory). Block 54 automatically appends a protected range to the memory map, wherein the protected range eliminates the misalignment condition. In one example, the granularity of the register is a power of two and the protected range eliminates the misalignment condition by moving the upper limit of an address range in the memory map to a power of two address. As will be discussed in greater detail, block 54 may also involve confirming that sufficient resources are available to append to the protected range to the memory map.

In an embodiment, block 54 appends the protected range via a source address decoder (SAD) rule. In general, a SAD is a cache and home agent (CHA) component that may define the layout of the physical address space for each set of processors that share a last level cache (LLC). In an embodiment, the SAD is responsible for directing memory requests to the LLC where the addressed memory cell is locally attached. Unlike MTRRs, SAD rules may not be limited to power of two size granularity. Accordingly, the SAD rule may be used to size the protected range to achieve sufficient cacheable memory alignment for MTRR programming.

In one example, the protected memory range is a non-existent memory (NXM) range. The NXM attribute may generally be used to indicate "holes" in the memory map. Illustrated block 56 provides for defining an operational characteristic (e.g., cacheability characteristic) of the memory map via the register. Thus, block 56 might designate the address range as write-back, uncached, write-through, write-protect, and so forth. The illustrated method 50 therefore reduces the number of registers involved in fully caching the memory configuration and enhances performance at least in terms of fewer fatal errors, boot sequence faults and/or mapped memory losses.

Figure 6:
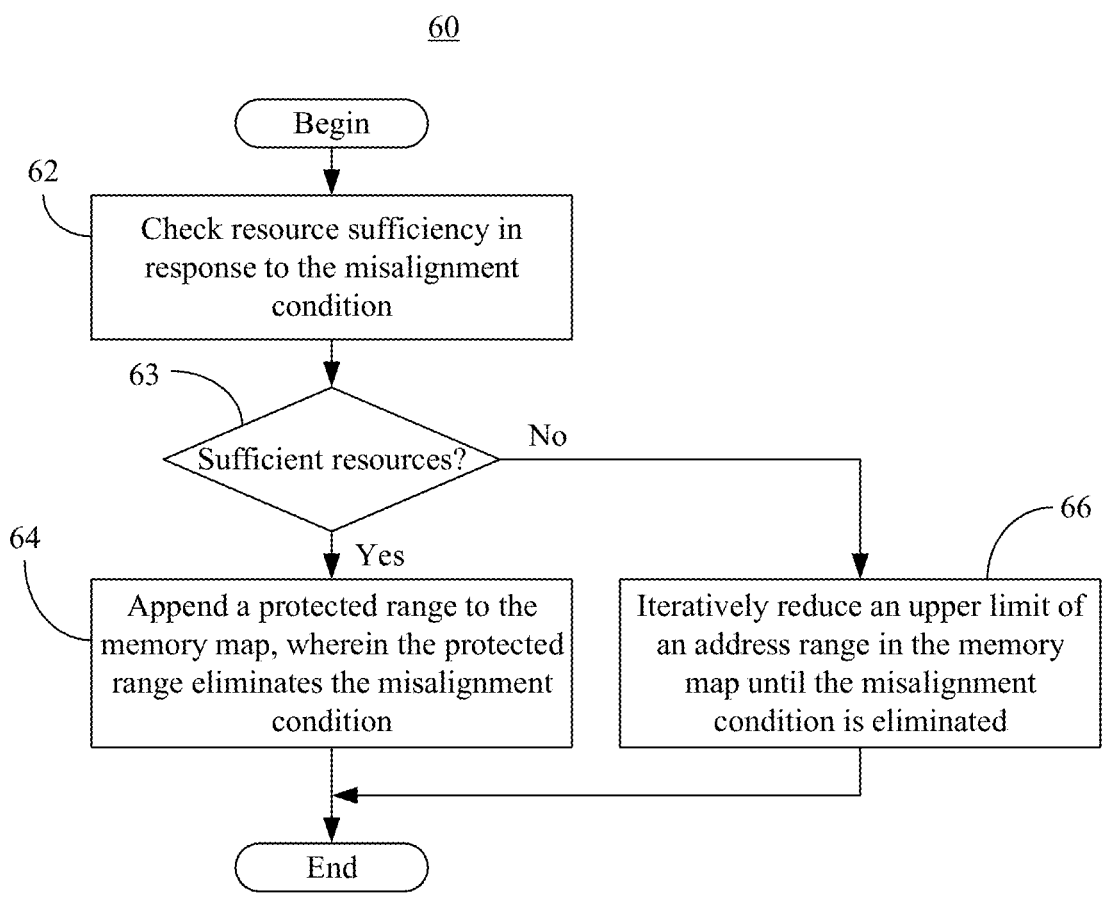
FIG. 6 is a flowchart of an example of a method of eliminating a misalignment condition according to an embodiment.

FIG. 6 shows a method 60 of eliminating a misalignment condition. The method 60 might be incorporated into block 54 (FIG. 5), already discussed. More particularly, the method 60 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 62 checks resource sufficiency in response to a misalignment condition. In an embodiment, block 63 determines whether sufficient silicon resources such as, for example, SAD rules, protected ranges, address space, etc., are present to append a protected rule. If so, block 64 may append the protected range to the memory map, wherein the protected rule eliminates the misalignment condition. Otherwise, illustrated block 66 iteratively reduces the upper limit of the address range in the memory map until the misalignment condition is eliminated, wherein appending the protected range to the memory map at block 64 is bypassed. In one example, block 66 includes reducing the cacheable memory ceiling by the smallest power of two available until all memory and required cache regions can be completely represented in the MTRR programming. Block 66 may also update the UEFI memory map to mark the uncached memory region as reserved to prevent UEFI drivers and the operating system (OS) from using performance-degraded memory. The illustrated method 60 therefore further enhances performance by ensuring that sufficient resources are available prior to appending the protected range to the memory map.

Figure 7:
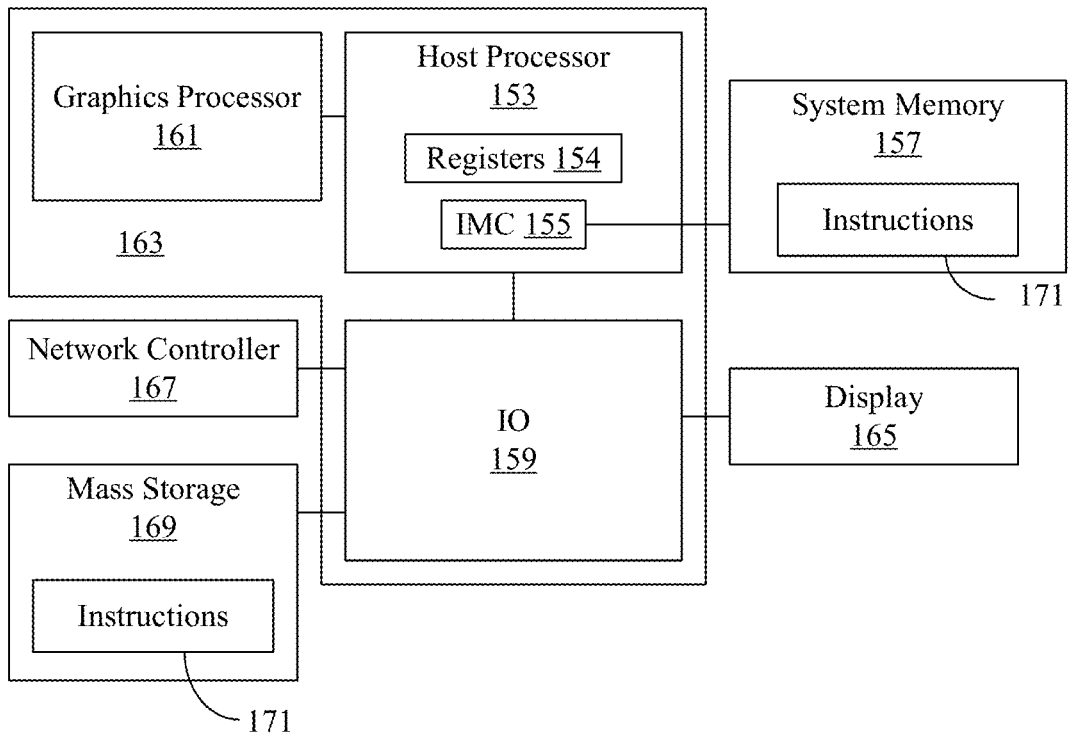
FIG. 7 is a block diagram of an example of a performance-enhanced computing system according to an embodiment.

Turning now to FIG. 7, a performance-enhanced computing system 151 is shown. The system 151 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 151 includes a host processor 153 (e.g., central processing unit/CPU) having a plurality of registers 154 and an integrated memory controller (IMC) 155 that is coupled to a system memory 157 (e.g., PMM or other complex memory configuration). In an embodiment, the plurality of registers 154 include a limited number of MTRRs.

The illustrated system 151 also includes an input output (10) module 159 implemented together with the host processor 153 and a graphics processor 161 on a semiconductor die 163 as a system on chip (SoC). The illustrated 10 module 159 communicates with, for example, a display 165 (e.g., touch screen, liquid crystal display/LCD, light emitting diode/LED display), a network controller 167 (e.g., wired and/or wireless), and mass storage 169 (e.g., hard disk drive/HDD, optical disk, solid state drive/SSD, flash memory).

In an embodiment, the host processor 153, the graphics processor 161 and/or the 10 module 159 execute program instructions 171 retrieved from the system memory 157 and/or the mass storage 169 to perform one or more aspects of the method 50 (FIG. 5) and/or the method 60 (FIG. 6), already discussed. Thus, execution of the illustrated instructions 171 may cause the computing system 151 to detect a misalignment condition, wherein the misalignment condition includes a memory map being misaligned with a granularity of a register in the plurality of registers 154. Execution of the program instructions 171 may also cause the computing system 151 to automatically append a protected range to the memory map (e.g., in response to the misalignment condition), wherein the protected range eliminates the misalignment condition, and define an operational characteristic of the memory map via the register. In one example, the protected range is an NXM range appended via a SAD rule, the register is an MTRR, and the operational characteristic is a cache characteristic.

More particularly, there may be two components to the protected range—a SAD rule and a GENPROT (general protection) register range. In one example, the GENPROT registers protect against the following issues/attacks: preventing direct memory accesses (DMA's) by programming a GENPROT range to cover the NXM ranges (e.g., providing protection from spurious DMAs); and returning false data (e.g., issuing a "CRAB Abort" by silently dropping writes, and returning all 1's on reads) as an additional level of Silicon protection if a software entity attempts to access NXM range (e.g., protecting against malicious software drivers). Thus, the SAD rule may cover mapping/routing and the GENPROT register range may cover protection. The illustrated computing system 151 is therefore considered to be performance-enhanced at least to the extent that it reduces the number of registers involved in fully caching the memory configuration, eliminates fatal errors, reduces boot sequence faults and/or reduces mapped memory losses.

Figure 8:
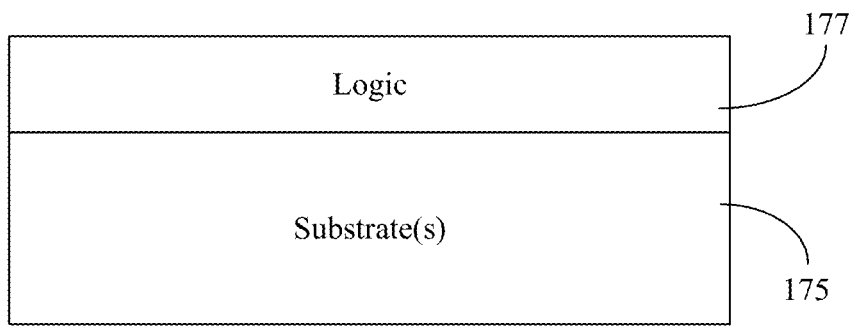
FIG. 8 is an illustration of an example of a semiconductor apparatus according to an embodiment.

FIG. 8 shows a semiconductor package apparatus 173. The illustrated apparatus 173 includes one or more substrates 175 (e.g., silicon, sapphire, gallium arsenide) and logic 177 (e.g., transistor array and other integrated circuit/IC components) coupled to the substrate(s) 175. The logic 177 may be implemented at least partly in configurable logic or fixed-functionality logic hardware. In one example, the logic 177 implements one or more aspects of the method 50 (FIG. 5) and/or the method 60 (FIG. 6), already discussed. Thus, the logic 177 may detect a misalignment condition, wherein the misalignment condition includes a memory map being misaligned with a size of a register, automatically append a protected range to the memory map, wherein the protected range eliminates the misalignment condition, and define an operational characteristic of the memory map via the register. In one example, the protected range is an NXM range appended via a SAD rule, the register is an MTRR, and the operational characteristic is a cache characteristic. As already noted, the protected range may also have GENPROT protection from spurious direct memory accesses and malicious software drivers. The illustrated apparatus 173 is therefore considered to be performance-enhanced at least to the extent that it reduces the number of registers involved in fully caching the memory configuration, eliminates fatal errors and/or reduces boot sequence faults.

In one example, the logic 177 includes transistor channel regions that are positioned (e.g., embedded) within the substrate(s) 175. Thus, the interface between the logic 177 and the substrate(s) 175 may not be an abrupt junction. The logic 177 may also be considered to include an epitaxial layer that is grown on an initial wafer of the substrate(s) 175.

Figure 9:
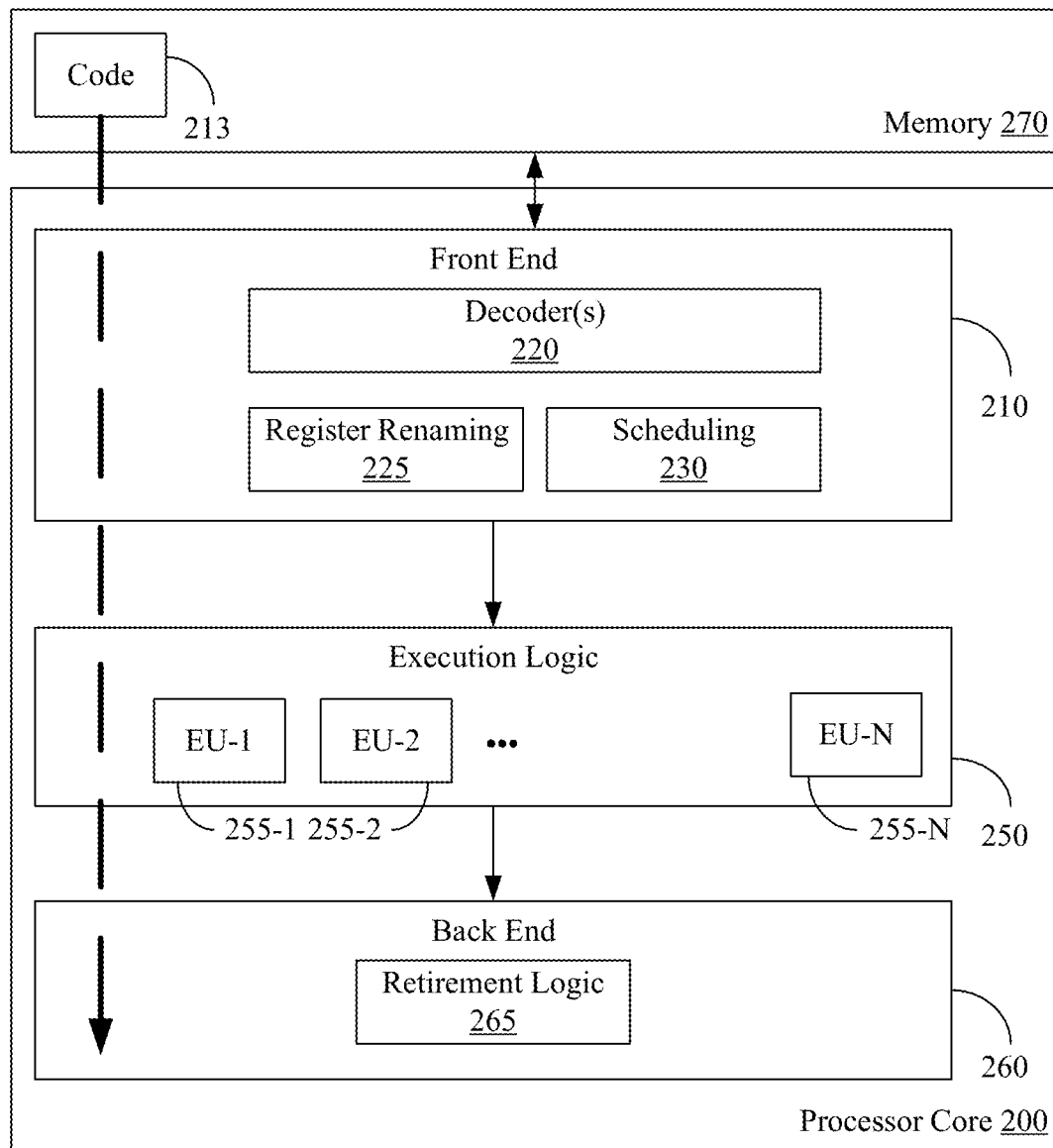
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 50 (FIG. 5) and/or the method 60 (FIG. 6), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 50 (FIG. 5) and/or the method 60 (FIG. 6), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

ADDITIONAL NOTES AND EXAMPLES

Example 1 includes a performance-enhanced computing system comprising a network controller, a processor coupled to the network controller, wherein the processor includes a register, and a memory coupled to the processor, the memory comprising as set of executable program instructions, which when executed by the processor, cause the computing system to detect a misalignment condition, wherein the misalignment condition includes a memory map being misaligned with a granularity of the register, append a protected range to the memory map, wherein the protected range eliminates the misalignment condition, and define an operational characteristic of the memory map via the register.

Example 2 includes the computing system of Example 1, wherein the granularity of the register is to be a power of two and the protected range is to eliminate the misalignment condition by a move of an upper limit of an address range in the memory map to a power of two address.

Example 3 includes the computing system of Example 1, wherein the instructions, when executed, cause the computing system to confirm that sufficient resources are available to append the protected range to the memory map.

Example 4 includes the computing system of Example 1, wherein the protected range is appended to the memory map if sufficient resources are available, and wherein the instructions, when executed, cause the computing system to determine that there are insufficient resources available to append the protected range to the memory map, and iteratively reduce an upper limit of an address range in the memory map until the misalignment condition is eliminated.

Example 5 includes the computing system of Example 1, wherein the protected range is to be appended via a source address decoder rule, protected from spurious direct memory accesses, and protected from malicious software drivers.

Example 6 includes the computing system of any one of Examples 1 to 5, wherein the protected range is to be a non-existent memory range, the register is to be a memory type range register, and the operational characteristic is to be a cache characteristic.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to detect a misalignment condition, wherein the misalignment condition includes a memory map being misaligned with a granularity of a register, append a protected range to the memory map, wherein the protected range eliminates the misalignment condition, and define an operational characteristic of the memory map via the register.

Example 8 includes the semiconductor apparatus of Example 7, wherein the granularity of the register is to be a power of two and the protected range is to eliminate the misalignment condition by a move of an upper limit of an address range in the memory map to a power of two address.

Example 9 includes the semiconductor apparatus of Example 7, wherein the logic is to confirm that sufficient resources are available to append the protected range to the memory map.

Example 10 includes the semiconductor apparatus of Example 7, wherein the protected range is appended to the memory map if sufficient resources are available, and wherein the logic is to determine that there are insufficient resources available to append the protected range to the memory map, and iteratively reduce an upper limit of an address range in the memory map until the misalignment condition is eliminated.

Example 11 includes the semiconductor apparatus of any one of Examples 7 to 10, wherein the protected range is to be appended via a source address decoder rule, the protected range is to be a non-existent memory range, the register is to be a memory type range register, and the operational characteristic is to be a cache characteristic.

Example 12 includes the semiconductor apparatus of any one of Examples 7 to 11, wherein the logic coupled to the one or more substrates includes transistor channel regions that are positioned within the one or more substrates.

Example 13 includes at least one computer readable storage medium comprising a set of executable program instructions, which when executed by a computing system, cause the computing system to detect a misalignment condition, wherein the misalignment condition includes a memory map being misaligned with a granularity of a register, append a protected range to the memory map, wherein the protected range eliminates the misalignment condition, and define an operational characteristic of the memory map via the register.

Example 14 includes the at least one computer readable storage medium of Example 13, wherein the granularity of the register is to be a power of two and the protected range is to eliminate the misalignment condition by a move of an upper limit of an address range in the memory map to a power of two address.

Example 15 includes the at least one computer readable storage medium of Example 13, wherein the instructions, when executed, cause the computing system to confirm that sufficient resources are available to append the protected range to the memory map.

Example 16 includes the at least one computer readable storage medium of Example 13, wherein the protected range is appended to the memory map if sufficient resources are available, and wherein the instructions, when executed, cause the computing system to determine that there are insufficient resources available to append the protected range to the memory map, and iteratively reduce an upper limit of an address range in the memory map until the misalignment condition is eliminated.

Example 17 includes the at least one computer readable storage medium of Example 13, wherein the protected range is to be appended via a source address decoder rule, protected from spurious direct memory accesses, and protected from malicious software drivers.

Example 18 includes the at least one computer readable storage medium of any one of Examples 13 to 17, wherein the protected range is to be a non-existent memory range, the register is to be a memory type range register, and the operational characteristic is to be a cache characteristic.

Example 19 includes a method of operating a performance-enhanced computing system, the method comprising detecting a misalignment condition, wherein the misalignment condition includes a memory map being misaligned with a granularity of a register, automatically appending a protected range to the memory map, wherein the protected range eliminates the misalignment condition, and defining an operational characteristic of the memory map via the register.

Example 20 includes the method of Example 19, wherein the granularity of the register is a power of two and the protected range eliminates the misalignment condition by moving an upper limit of an address range in the memory map to a power of two address.

Example 21 includes the method of Example 19, further including confirming that sufficient resources are available to append the protected range to the memory map.

Example 22 includes the method of Example 19, wherein the protected range is appended to the memory map if sufficient resources are available, the method further including determining that there are insufficient resources available to append the protected range to the memory map, and iteratively reducing an upper limit of an address range in the memory map until the misalignment condition is eliminated.

Example 23 includes the method of Example 19, wherein the protected range is appended via a source address decoder rule, protected from spurious direct memory accesses, and protected from malicious software drivers.

Example 24 includes the method of any one of Examples 19 to 23, wherein the protected range is a non-existent memory range, the register is a memory type range register, and the operational characteristic is a cache characteristic.

Example 25 includes an apparatus comprising means for performing the method of any one of Examples 19 to 24.

Thus, technology described herein may provide a scalable solution that addresses potential MTRR shortfalls in a manner that maximizes coverage and mitigates the risk of problem escalations.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a network controller;
   a processor coupled to the network controller, wherein the processor includes a register; and
   a memory coupled to the processor, the memory comprising a set of executable program instructions, which when executed by the processor, cause the computing system to:
   detect a misalignment condition, wherein the misalignment condition includes a memory map being misaligned with a granularity of the register;
   append a protected range to the memory map, wherein the protected range eliminates the misalignment condition; and
   define an operational characteristic of the memory map via the register.

2. The computing system of claim 1, wherein the granularity of the register is to be a power of two and the protected range is to eliminate the misalignment condition by a move of an upper limit of an address range in the memory map to a power of two address.

3. The computing system of claim 1, wherein the instructions, when executed, cause the computing system to confirm that sufficient resources are available to append the protected range to the memory map.

4. The computing system of claim 1, wherein the protected range is appended to the memory map if sufficient resources are available, and wherein the instructions, when executed, cause the computing system to:
   determine that there are insufficient resources available to append the protected range to the memory map; and
   iteratively reduce an upper limit of an address range in the memory map until the misalignment condition is eliminated.

5. The computing system of claim 1, wherein the protected range is to be appended via a source address decoder rule, protected from spurious direct memory accesses, and protected from malicious software drivers.

6. The computing system of claim 1, wherein the protected range is to be a non-existent memory range, the register is to be a memory type range register, and the operational characteristic is to be a cache characteristic.

7. A semiconductor apparatus comprising:
   one or more substrates; and
   logic coupled to the one or more substrates, wherein the logic is implemented at least partly in one or more of configurable logic or fixed-functionality hardware logic, the logic coupled to the one or more substrates to:

detect a misalignment condition, wherein the misalignment condition includes a memory map being misaligned with a granularity of a register;

append a protected range to the memory map, wherein the protected range eliminates the misalignment condition; and define an operational characteristic of the memory map via the register.

8. The semiconductor apparatus of claim 7, wherein the granularity of the register is to be a power of two and the protected range is to eliminate the misalignment condition by a move of an upper limit of an address range in the memory map to a power of two address.

9. The semiconductor apparatus of claim 7, wherein the logic is to confirm that sufficient resources are available to append the protected range to the memory map.

10. The semiconductor apparatus of claim 7, wherein the protected range is appended to the memory map if sufficient resources are available, and wherein the logic is to:

determine that there are insufficient resources available to append the protected range to the memory map; and iteratively reduce an upper limit of an address range in the memory map until the misalignment condition is eliminated.

11. The semiconductor apparatus of claim 7, wherein the protected range is to be appended via a source address decoder rule, the protected range is to be a non-existent memory range, the register is to be a memory type range register, and the operational characteristic is to be a cache characteristic.

12. The semiconductor apparatus of claim 7, wherein the logic coupled to the one or more substrates includes transistor channel regions that are positioned within the one or more substrates.

13. At least one non-transitory computer readable storage medium comprising a set of executable program instructions, which when executed by a computing system, cause the computing system to: detect a misalignment condition, wherein the misalignment condition includes a memory map being misaligned with a granularity of a register; append a protected range to the memory map, wherein the protected range eliminates the misalignment condition; and define an operational characteristic of the memory map via the register.

14. The at least one non-transitory computer readable storage medium of claim 13, wherein the granularity of the register is to be a power of two and the protected range is to eliminate the misalignment condition by a move of an upper limit of an address range in the memory map to a power of two address.

15. The at least one non-transitory computer readable storage medium of claim 13, wherein the instructions, when executed, cause the computing system to confirm that sufficient resources are available to append the protected range to the memory map.

16. The at least one non-transitory computer readable storage medium of claim 13, wherein the protected range is appended to the memory map if sufficient resources are available, and wherein the instructions, when executed, cause the computing system to: determine that there are insufficient resources available to append the protected range to the memory map; and iteratively reduce an upper limit of an address range in the memory map until the misalignment condition is eliminated.

17. The at least one non-transitory computer readable storage medium of claim 13, wherein the protected range is to be appended via a source address decoder rule, protected from spurious direct memory accesses, and protected from malicious software drivers.

18. The at least one non-transitory computer readable storage medium of claim 13, wherein the protected range is to be a non-existent memory range, the register is to be a memory type range register, and the operational characteristic is to be a cache characteristic.

19. A method comprising:

detecting a misalignment condition, wherein the misalignment condition includes a memory map being misaligned with a granularity of a register;

automatically appending a protected range to the memory map, wherein the protected range eliminates the misalignment condition; and defining an operational characteristic of the memory map via the register.

20. The method of claim 19, wherein the granularity of the register is a power of two and the protected range eliminates the misalignment condition by moving an upper limit of an address range in the memory map to a power of two address.

21. The method of claim 19, further including confirming that sufficient resources are available to append the protected range to the memory map.

22. The method of claim 19, wherein the protected range is appended to the memory map if sufficient resources are available, the method further including:

determining that there are insufficient resources available to append the protected range to the memory map; and iteratively reducing an upper limit of an address range in the memory map until the misalignment condition is eliminated.

23. The method of claim 19, wherein the protected range is appended via a source address decoder rule, protected from spurious direct memory accesses, and protected from malicious software drivers.

24. The method of claim 19, wherein the protected range is a non-existent memory range, the register is a memory type range register, and the operational characteristic is a cache characteristic.

* * * * *